Figure 1:
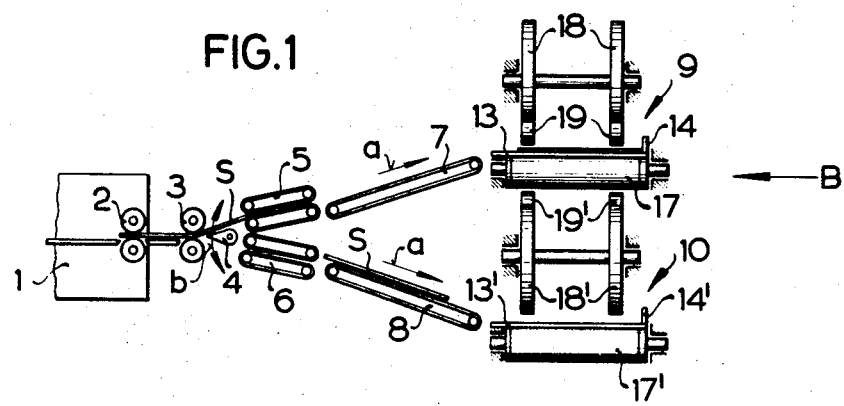

United States Patent

Brockmüller

[15] 3,703,951
[45] Nov. 28, 1972

[54] APPARATUS FOR TRANSFERRING WORKPIECES WHICH ARE INTENDED FOR THE MANUFACTURE OF BAGS

[72] Inventor: Friedrich Franz Brockmüller, Lengerich Westphalia, Germany

[73] Assignee: Windmöller & Hölscher, Lengerich of Westphalia, Germany

[22] Filed: June 2, 1970

[21] Appl. No.: 42,806

[30] Foreign Application Priority Data

June 11, 1969 Germany..........P 19 29 600.5

[52] U.S. Cl....................................198/20 T, 198/32
[51] Int. Cl...............................................B65g 47/68
[58] Field of Search........198/1, 20, 20 T, 31, 31 AB, 198/32, 78, 81, 102; 271/64, 9, 69, DIG. 4

[56] References Cited

UNITED STATES PATENTS 2,886,929  5/1959  Villemont..........198/31 AC X
3,339,700  9/1967  Wells....................198/31 AB
2,243,557  5/1941  Finster..................271/DIG. 4

FOREIGN PATENTS OR APPLICATIONS 1,010,733  11/1965  Great Britain...............271/64

Primary Examiner—Edward A. Sroka
Attorney—Fleit, Gipple & Jacobson

[57] ABSTRACT

An apparatus for transferring workpieces, in particular tube portions for the manufacture of bags, which are continuously advance in a row in the longitudinal direction, into a row continuously advanced in the transverse direction comprises two delivery conveyor means for continuously advancing the workpieces in the longitudinal direction of the workpieces. A separator device feeds alternately the workpieces to the two delivery conveyor means. Two transverse conveyor means advance the workpieces in the transverse direction of the workpieces associated respectively with the discharge ends of the delivery conveyor means.

9 Claims, 3 Drawing Figures

INVENTOR
Franz BROCKMÜLLER

By

Fleit, Gipple + Jacobson
his ATTORNEYS

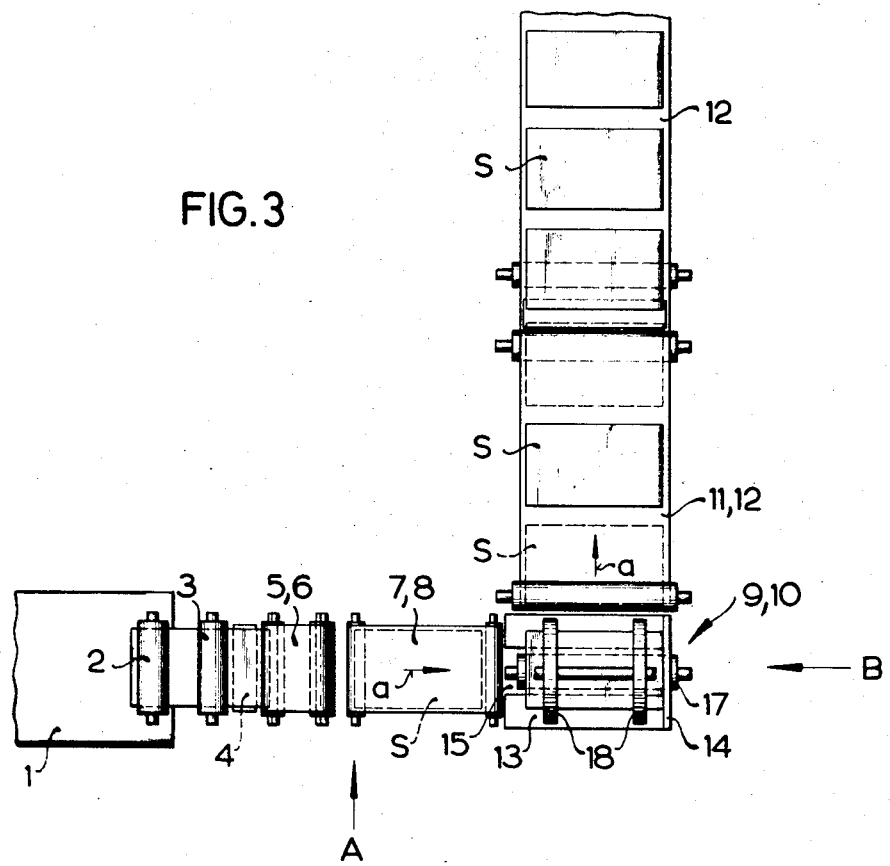

APPARATUS FOR TRANSFERRING WORKPIECES WHICH ARE INTENDED FOR THE MANUFACTURE OF BAGS

This invention relates to apparatus for transferring workpieces which are intended for the manufacture of bags.

In the production of bags from single-ply or multi-ply webs of paper and/or plastics film or other materials or combinations of materials, the starting workpieces are flat tube portions. It is known that the tube portions are produced either in a tube drawing machine which continuously makes a flat single-ply or multi-ply web of material into a tube form, and then cuts the resulting web of tube into the necessary lengths by means of rotating transverse cutters, to form the tube portions, or are severed by rotating transverse cutters from a seamlessly extruded web of plastics tube. After leaving the transverse cutting apparatus, the tube portions are transported in a continuous row at small spacing from each other in their longitudinal direction.

This longitudinal formation of the tube portions is however of no use for the further processing thereof in the downstream machine which closes the bottoms of the bags. The tube portions must be supplied to the latter machine in a transverse position so that the tube apertures are accessible to the bottom closure tools which operate from the side. It was therefore necessary to stack the tube portions delivered by the tube making machine, and to deliver the stack in a transverse position to the bottom closure machine. For this purpose a stacking device must be arranged downstream of the tube making machine and a feeder for the tube portions must be arranged upstream of the bottom closure machine.

The invention is based on the problem of providing an apparatus by means of which the tube portions or similar workpieces which are advanced in a row in the longitudinal direction are continuously moved at a high rate from the longitudinal to the transverse position in which they continuously move to one or more bottom closure machines.

According to the present invention there is provided apparatus for transferring workpieces, in particular tube portions for the manufacture of bags, which are continuously advanced in a row in the longitudinal direction, into a row continuously advanced in the transverse direction, comprising two delivery conveyor means for continuously advancing the workpieces in the longitudinal direction of the workpieces, a separator device for alternately feeding the workpieces to the two delivery conveyor means, and two transverse conveyor means for advancing the workpieces in the transverse direction of the workpieces associated respectively with the discharge ends of the delivery conveyor means.

Preferably each transverse conveyor means comprises a transverse conveyor at the discharge end of the associated delivery means for conveying the workpieces intermittently, and a subsequent conveyor for conveying the workpieces continuously, said transverse conveyors operating alternatively to convey the workpieces. In this embodiment of the invention the workpieces first come to a standstill before they are conveyed away to the side by the transverse conveyor, so it is possible to ensure in the transverse conveyor path a conveying movement which is precisely adapted to the working cycle of the bottom closure machine arranged downstream thereof.

Preferably each transverse conveyor comprises a table having an aperture therein, and rotatable conveyor members disposed above and below the table in the region of the aperture for intermittently advancing the workpieces.

For each transverse conveyor the conveyor members may comprise two rollers mounted respectively above and below the table, the roller above the table being continuously rotatable and alternately movable towards and away from the lower roller; or alternatively may comprise two rollers mounted respectively above and below the table, the roller above the table comprising a segment portion of larger radius for intermittently engaging the workpieces, the segment portions of the two transverse conveyors being relatively displaced by 180°.

The transverse conveyor means can be arranged one above the other and can convey the workpieces in the same direction. In a further particularly advantageous form of the invention, said subsequent conveyors are arranged so that workpieces conveyed by one of the subsequent conveyors are deposited into the spaces between the workpieces conveyed by the other subsequent conveyor. In this way the rows of workpieces are reunited to form a single row in which however the workpieces are in the transverse position necessary for the downstream bottom closure machine, and are equally spaced apart, and are possibly also moved more slowly, corresponding to their smaller dimensions in the direction of travel.

The rows of workpieces arriving in the longitudinal direction are converted into a row in which the workpieces are in a transverse position, in a continuous flow which permits any desired speed of conveyance to be used. Thus the apparatus according to the invention makes it possible for a bottom closure machine to be continuously charged with tube portions at a rate which is as high as may be desired, and without trouble, without any stacking operation having to be interposed between the operation of making the tube and the further processing of the tube portions. The apparatus is of particular advantage in the production of bags or sacks made of plastics tubes as plastics tubes are difficult to handle by virtue of their low degree of rigidity and, by means of the division into a plurality of conveyor paths in each direction-changing station, there is sufficient time, in spite of the high total throughput, to move the tube portions suitably.

If the tube portions are not be united to form a single row downstream of the transverse conveyors, each subsequent conveyor arranged downstream of a transverse conveyor can deliver the rows of tube portions which it advances in the transverse position, to another bottom closure machine. In this way, a plurality of bottom closure machines can be readily supplied with tube portions by one tube making machine, which provides for particularly good economy in view of the production output of the tube making machine, which is frequently considerably higher in comparison with the bottom closure machines.

If the tube portions are to be moved on in the same direction transversely, the bottom closure tools can be arranged one above the other in a multi-tier mode of construction. In order to permit better utilization of space in the case of bottom closure machines are not arranged one above the other, in accordance with a further proposal of the invention, it can be provided that the transverse conveyor means convey in opposed directions so that the two or more bottom closure machines can be arranged to the right and to the left of the path of conveyance of the delivery conveyors.

In accordance with a further proposal of the invention, the speed of conveyance of the continuous conveyors which preferably comprise conveyor belts can be adjustable. In this way, the spacing with which the tube portions are fed in a transverse position to the bottom closure machines may be varied as desired without varying the working cycle, and thus be precisely adapted to the tool arrangement of the bottom closure machine. As the speed of conveyance in each transverse conveyor station can be substantially reduced, by reducing the distance between the tube portions, it is possible for example for a bottom welding station arranged downstream thereof to be of a correspondingly short dimension. In addition, by using a corresponding speed of the branch longitudinal conveyors it is possible for the speed of the tube portions to be reduced before they pass into the direction-changing apparatus by such an extent as to eliminate any rebounding of the tube portions at a stop member which terminates the longitudinal conveying movement.

Figure 2:
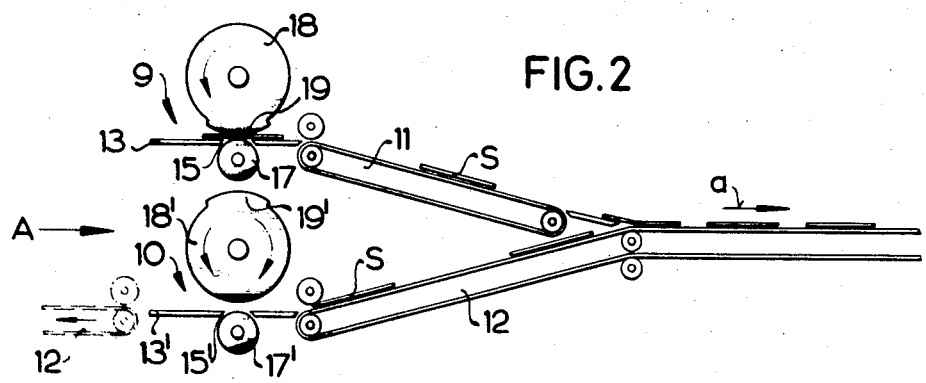

Apparatus in accordance with the present invention will now be described by way of example with reference to the accompanying drawings, in which:

FIG. 1 is a side view of the apparatus in the direction of the arrow A in FIGS. 2 and 3, FIG. 2 is another side view of the apparatus in the direction of the arrow B in FIGS. 1 and 3, and FIG. 3 is a plan view of the apparatus.

The apparatus will usually be arranged downstream of a known tube drawing machine 1 of which the uniformly rotating pairs of rollers 2 and 3 take away the tube portions S produced in a continuous row in the longitudinal direction and at a small distance apart, and deliver them to the apparatus according to the invention.

In the direction a of conveyance of the tube portions S, the apparatus comprises a separator member 4, double-belt conveyors 5 and 6 associated therewith and arranged one above the other, two single-belt conveyors 7 and 8 arranged one above the other, two transverse conveyors 9 and 10, and two single-belt conveyors 11 and 12 arranged one above the other and extending perpendicular to the conveyors 7 and 8. The conveyors 9 and 10 convey the tube portions S intermittently and the other conveyors 5 to 8, 11 and 12 convey them continuously.

The lower conveyor 12 extends beyond the conveyor 11 and carries the tube portions S to the bottom closure machine (not shown). The mutual arrangement of the conveyors 11 and 12 in such that the upper conveyor 11 transfers the tube portions S which it carries to the lower conveyor 12 upon which they precisely fill the gaps between the tube portions S of the lower conveyor 12, owing to the equal distances traversed in each of the two paths.

The conveyors 9 and 10 comprise a table 13 or 13' arranged respectively adjacent the end of one of the two conveyors 7 ad 8, so that they take the tube portions S and align them at a stop edge 14 or 14'. Provided in the tables 13 and 13' are apertures 15 and 15' respectively, in the region of which pairs of conveyor rollers 17 and 18, and 17' and 18' respectively, are arranged so that they rotate tranversely to the direction of conveyance of the conveyors 7 and 8. The conveyor rollers 17 and 17' project through the apertures 15 and 15' as far as the upper surface thereof and rotate continuously. The upper rollers 18 and 18' each comprise two segment discs 19 and 19' mounted parallel to one another on a common shaft, and they rotate continuously but in the opposite direction to the lower rollers 17 and 17'. The rollers 18 and 18' are mounted parallel to the lower rollers 17 and 17' at such a spacing that, as they rotate, they co-operate therewith only with their larger-radius segment portions, that is to say, intermittently. The drive for the rollers 17 and 17', and 18 and 18' is such that their peripheral speeds are equal.

The separator member 4 is pivotable upwardly and downwardly in the direction of the arrow b in the working cycle of the tube drawing machine 1. The conveyors 7 and 8 have controllable drive means for varying their speed of conveyance. The segments of the conveyor 9 are displaced in the peripheral direction through 180° relative to those of the conveyor 10. They rotate at half the speed of the tube drawing machine 1 so that they complete their conveyor steps alternately in double the time interval of the working cycle of the tube drawing machine 1. The periphery selected for the segment discs 19 and 19' determines their speed of conveyance. In an alternative in which upwardly and downwardly movable upper rollers are used, the speed and duration of conveyance can be freely selected in each case.

The tube portions S are taken away from the tube drawing machine 1 in their longitudinal direction by the rollers 2 and 3 in a row, the tube portions S being at small distances apart, and delivered to the separator member 4 which alternately diverts a tube portionS upwardly and the following tube portion S downwardly out of the row, in the working cycle of the tube drawing machine 1. Thus, one tube portion S passes alternately to the upper conveyor 7 and the following tube portion S to the lower conveyor 8. The tube portions S are then delivered on the conveyors 7 and 8 in rows, being spaced at double the distance, to the tables 13 and 13' of the conveyors 9 and 10. The segment discs 19 and 19' engage the tube portions S and move them transversely to their previous direction of movement, that is to say, in the transverse position, into the region of the conveyors 11 and 12.

The two rows of tube portions S advanced on the conveyors 7 and 8 are displaced relative to each other, and accordingly the conveyor steps of the two conveyors 9 and 10 are displaced relative to each other in time by the length of one cycle of the tube drawing machine 1 by having the segment discs 19 and 19' displaced with respect to each other through 180°. In this way the tube portions S are formed on the conveyors 11 and 12 into rows in the transverse position, the rows also being displaced relative to each other by a distance corresponding to their original spacing. By means of a corresponding mutual arrangement of the conveyors 11 and 12, the tube portions S which are advanced on the upper conveyor 11 are discharged precisely into gaps between the tube portions S which are advanced on the lower conveyor 12, and thus combine on the conveyor 12 to re-form a row in which the tube portions S can be moved on with equal spacings between them, but in the transverse position, to the bottom closure machine.

As long as the speeds of conveyance of all the conveyors 5 to 12 are equal, the distances between the tube portions S on the conveyors remain unchanged. According to the width of the tube portions S, which is less than their length, the distances between the tube portions S which are re-united on the conveyor 12 are however obviously substantially greater than the distances between the tube portions S when they are taken from the tube drawing machine 1 in the longitudinal direction. By varying the speeds of the conveyors 7 and 8, and 11 and 12, the distances between the tube portions S can be reduced as desired on the conveyors 11 and 12, without simultaneously varying the working cycle.

As shown in FIG. 2 in broken lines, the arrangement of the conveyors 11 and 12 can also be such that each of them charges an associated bottom closure machine arranged downstream thereof. In this arrangement, for reasons of space it is of advantage for one conveyor 11 to be arranged on the right-hand side of the conveyors 7 and 8, and for the other conveyor 12 to be arranged on the left side, and for the conveyors 11 and 12 to convey in opposite directions. In this case however, the two conveyors 9 and 10 must also rotate in opposite directions, as indicated by the broken-line arrow in the segment disc 19'.

I claim:

1. Apparatus for transferring flat, elongate workpieces, in particular tube portions for the manufacture of bags, from a continuous longitudinal feeding to a continuous transverse feeding, comprising a first longitudinal delivery conveyor means for continuously advancing the workpieces in their longitudinal direction, at least two second longitudinal delivery conveyor means for continuously advancing the workpieces in their longitudinal direction arranged downstream of said first longitudinal conveyor means, a separator device arranged between said first and second longitudinal conveyor means for alternately feeding the workpieces to said two second longitudinal conveyor means, at least two transverse conveyor means for advancing the workpieces in their transverse direction associated respectively with the discharge ends of said second longitudinal conveyor means and extending at right angles thereto and wherein each transverse conveyor means comprises a transverse conveyor at the discharge end of the associated second longitudinal delivery means for conveying the workpieces intermittently, and a subsequent conveyor for conveying the workpieces continuously, said intermittent transverse conveyors operating alternately to convey the workpieces.

2. Apparatus according to claim 1, wherein the speed of said subsequent conveyors is adjustable.

3. Apparatus according to claim 1 wherein each intermittent transverse conveyor comprises a table having an aperture therein, and rotatable conveyor members disposed above and below the table in the region of the aperture for intermittently advancing the workpieces.

4. Apparatus according to claim 2, wherein for each intermittent transverse conveyor the conveyor members comprise two rollers mounted respectively above and below the table, the roller above the table being continuously rotatable and alternately movable towards and away from the lower roller.

5. Apparatus according to claim 2, wherein for each intermittent transverse conveyor the conveyor members comprise two rollers mounted respectively above and below the table, the roller above the table comprising a segment portion of larger radius for intermittently engaging the workpieces, the segment portions of the two transverse conveyors being relatively displaced by 180°.

6. Apparatus according to claim 1 wherein the transverse conveyor means are arranged one above the other for conveying the workpieces in the same direction.

7. Apparatus according to claim 1 wherein said subsequent conveyors are arranged so that workpieces conveyed by one of the subsequent conveyors are deposited into the spaces between the workpieces conveyed by the other subsequent conveyor.

8. Apparatus according to claim 1 wherein the transverse conveyor means are operable to convey the workpieces in opposite directions.

9. Apparatus according to claim 1 wherein the speed of said longitudinal conveyor means is adjustable.

* * * * *